(12) United States Patent
Vivien et al.

(10) Patent No.: US 8,137,834 B2
(45) Date of Patent: Mar. 20, 2012

(54) PROPULSION CELL FOR A DEVICE IN AN AQUATIC MEDIUM

(75) Inventors: Didier Vivien, Cogolin (FR); Jean-Pierre Carmillet, Ste Maxime (FR)

(73) Assignee: DCN, Paris (FR)

( * ) Notice: Subject to any disclaimer, the term of this patent is extended or adjusted under 35 U.S.C. 154(b) by 917 days.

(21) Appl. No.: 10/579,551

(22) PCT Filed: Oct. 26, 2004

(86) PCT No.: PCT/FR2004/002754
§ 371 (c)(1),
(2), (4) Date: Jul. 10, 2006

(87) PCT Pub. No.: WO2005/053068
PCT Pub. Date: Jun. 9, 2005

(65) Prior Publication Data
US 2007/0105460 A1   May 10, 2007

(30) Foreign Application Priority Data
Nov. 17, 2003   (FR) ...................................... 03 13434

(51) Int. Cl.
*H01M 6/34* (2006.01)
*B60L 11/00* (2006.01)
*B63H 21/17* (2006.01)

(52) U.S. Cl. .......................................... 429/119; 440/6

(58) Field of Classification Search .................... 429/119
See application file for complete search history.

(56) References Cited

U.S. PATENT DOCUMENTS

| | | | | |
|---|---|---|---|---|
| 3,394,034 A | * | 7/1968 | Maes | 429/63 |
| 3,966,497 A | * | 6/1976 | Honer | 429/119 |
| 4,108,736 A | * | 8/1978 | Rigo et al. | 205/48 |
| 4,710,438 A | | 12/1987 | Leben et al. | |
| 4,752,542 A | * | 6/1988 | Leben et al. | 429/119 |
| 5,199,487 A | * | 4/1993 | DiFrancesco et al. | 165/168 |
| 5,506,065 A | * | 4/1996 | Tribioli et al. | 429/119 |
| 5,733,679 A | * | 3/1998 | Tucker et al. | 429/51 |
| 6,033,602 A | * | 3/2000 | Sunshine et al. | 252/511 |
| 2003/0167998 A1 | * | 9/2003 | Huntsman | 114/312 |
| 2003/0228516 A1 | * | 12/2003 | McDermott | 429/160 |

FOREIGN PATENT DOCUMENTS

| | | |
|---|---|---|
| EP | 0 307 292 A1 | 3/1989 |
| FR | 2 716 750 A1 | 9/1995 |

OTHER PUBLICATIONS

Machine translation of EP 0307292 A1, Chariot et al., Mar. 1989.*

* cited by examiner

*Primary Examiner* — Basia Ridley
*Assistant Examiner* — Sean P Cullen
(74) *Attorney, Agent, or Firm* — Young & Thompson

(57) ABSTRACT

An electrical cell for the propulsion of a device in an aquatic medium includes a first, second and third chamber forming a housing. The first chamber has an auxiliary electrical cell and a command and control module for the electrical propulsion cell, the second chamber a main electrical cell and members for the controlled admission and regulation of water flow from the aquatic medium in order to form an activation electrolyte for the main cell, and the third chamber a module for triggering the admission by suction of water and the discharge by escape of effluents from an admission valve and an escape valve. The command and control module activates the auxiliary electrical cell to generate electrical energy temporarily and the admission by suction of water from the aquatic medium and the discharge of effluents in order to produce electrical energy from the main electrical cell during a cruise phase.

20 Claims, 2 Drawing Sheets

PROPULSION CELL FOR A DEVICE IN AN AQUATIC MEDIUM

FIELD OF THE INVENTION

The invention relates to an electrical cell for the propulsion of a device in an aquatic medium.

BACKGROUND OF THE INVENTION

The propulsion of devices in an aquatic medium, especially when these devices of the underwater type are moving, at least for a short while in the submerged state, requires the provision of a propulsive energy, such as electrical energy, under conditions of power, duration and modulation by successive ranges which are well determined.

This is especially the case with underwater attack, response or observation devices launched from another carrying device, such as a submarine, such launched underwater devices then being subjected to a generally brief launch stage or phase followed by a longer cruise stage or phase.

The supply of electrical energy to such launched underwater devices must then meet very specific criteria in respect of electrical power delivered and duration of delivery of this energy, in order to enable the launched underwater devices to fulfil their mission in accordance with a pre-established programme.

Under these conditions, the use of conventional electrical energy sources, such as lead accumulator batteries, cannot be accepted owing, on the one hand, to the electrical power required to ensure such a function and, on the other hand, to the inert mass necessary in order to use such conventional sources of electrical energy.

The known electrical energy sources of the prior art of the thermal cell type generally enable substantial electrical power to be delivered. However, they require the provision of substantial thermal energy in order consequently to permit the provision of electrical power.

Therefore, such sources cannot be used for mission times of aquatic devices, especially underwater devices, exceeding some tens of seconds, owing to the major difficulty encountered in providing such an amount of electrical energy beyond such a time, from thermal sources on board such devices, especially when the latter are submerged.

SUMMARY OF THE INVENTION

The object of the present invention is to overcome the disadvantages of traditional electrical cells or sources of electrical energy which cannot be considered for immediate use in the context of the operational constraints mentioned above.

In particular, the present invention relates to the use of an electrical cell for the propulsion of a device in an aquatic medium, which cell permits the delivery of electrical power necessary and sufficient for the propulsion of this type of device in accordance with a launch phase followed by a cruise phase, over distances which may extend to 10 to 20 kilometres.

Furthermore, the present invention relates also to the use of an electrical cell for the propulsion of a device in an aquatic medium, which cell permits the delivery of the above-mentioned electrical power for a period of the order of from 30 to 45 minutes.

In addition, the present invention relates also to the use of an electrical cell for the propulsion of a device in an aquatic medium, which cell has a specific structure permitting, on the one hand, the storage of this electrical propulsion cell, which is inert in the absence of any activation, for a long period, for example several months, under optimum safety conditions, then the structural and/or functional integration of this cell in a device, for exploitation in the context of an operational mission, on simple activation when the electrical propulsion cell is immersed in an aquatic medium.

Finally, the present invention relates also to the use of an electrical cell for the propulsion of a device in an aquatic medium permitting the execution of missions of a non-destructive nature, the electrical propulsion cell, when the device has returned to its place of origin, being capable not only of being re-used, after reconditioning, but also of being stored under conditions of safety and reliability similar to those of a first use.

The electrical cell for the propulsion of a device in an aquatic medium, to which the present invention relates, is noteworthy in that it comprises at least, in a sealed cell body, a first chamber forming a housing comprising an auxiliary electrical cell and a command and control module for the electrical propulsion cell, a second chamber forming a housing comprising a main electrical cell of the electrochemical type, this second chamber being provided with members for the controlled admission and the regulation of a flow of water from the aquatic medium into this second chamber, which forms a reservoir, in order to form, after the command to admit water from the aquatic medium, an electrolyte for activating the main electrical cell, and a third chamber forming a housing comprising a module for triggering the admission by suction of water from the aquatic medium and the discharge by escape of effluents resulting from the chemical reaction of the main cell into the aquatic medium, from an admission valve and an escape valve, respectively, which are mounted in this third chamber, the command and control module of the electrical propulsion cell permitting the activation of the auxiliary electrical cell in order to generate electrical energy temporarily during a stage of launching this device in an aquatic medium, and the triggering of the admission by suction of water from the aquatic medium and of the discharge by escape of effluents in order to produce electrical energy from the main electrical cell during a cruise phase.

The electrical cell for the propulsion of a device in an aquatic medium, to which the present invention relates, can be used for the propulsion of devices of any type in an aquatic medium, such as, in particular, a torpedo, a reconnaissance or exploration device or submarine, a surface device, for example.

BRIEF DESCRIPTION OF THE DRAWINGS

The present invention will be better understood on reading the description and referring to the drawings hereinafter in which.

DETAILED DESCRIPTION OF EMBODIMENTS

A more detailed description of the electrical cell for the propulsion of a device in an aquatic medium according to the subject-matter of the present invention will now be given in conjunction with FIG. 1a and then FIG. 1b.

Figure 1A:
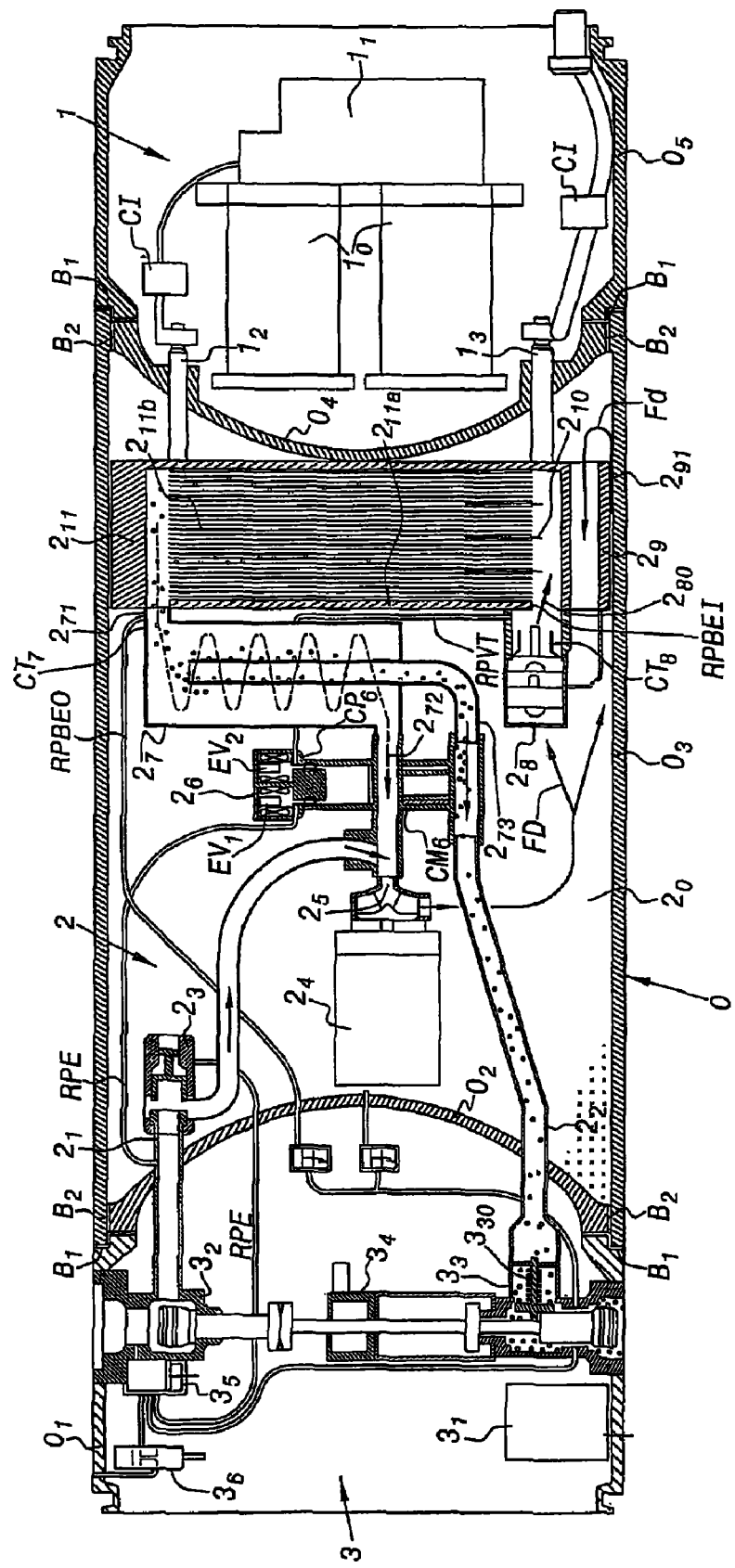
FIG. 1a is, purely by way of illustration, a sectional view, taken on a longitudinal plane of symmetry, of the electrical cell for the propulsion of a device in an aquatic medium, in accordance with the subject-matter of the present invention.

As can be seen in the above-mentioned FIG. 1a, the electrical cell to which the invention relates comprises at least, in a sealed cell body marked 0, a first chamber 1, a second chamber 2 and a third chamber 3, each of the above-mentioned chambers forming a housing.

The first chamber 1 comprises an auxiliary electrical cell marked $1_0$ and a command and control module marked $1_1$ for the electrical propulsion cell.

The second chamber 2 comprises a main electrical cell marked $2_{11}$, this main electrical cell advantageously being of the electrochemical type in order to operate under the conditions which will be explained hereinafter.

The second chamber 2 is also provided with members for the controlled admission and the regulation of a flow of water from the aquatic medium into the second chamber 2, which forms a reservoir, in order to constitute, after the command to admit water from the aquatic medium into the above-mentioned reservoir, an activation electrolyte marked $2_0$, the function of which is of course to activate the main electrical cell $2_{11}$.

Finally, the third chamber 3 comprises a module for triggering the admission by suction of water from the aquatic medium and the discharge by escape of the effluents resulting from the chemical reaction of the main cell into the aquatic medium, the operations of admission by suction and discharge by escape of the effluents being effected from an admission valve $3_2$ and an escape valve $3_3$, respectively, mounted in the third chamber 3.

The triggering module bears the reference $3_4$ in FIG. 1a. It permits the triggering of the admission by suction of water by means of the admission valve $3_2$ and, respectively, the command to discharge the effluents by means of the escape valve $3_3$, as will be described later on in the description.

According to a particularly advantageous aspect of the electrical cell for the propulsion of a device in an aquatic medium, to which the present invention relates, the command and control module $1_1$ of the electrical propulsion cell, which module is located in the first chamber 1, permits the activation of the auxiliary electrical cell $1_0$ in order to generate electrical energy temporarily during a stage of launching the device in an aquatic medium and permits the triggering of the admission by suction of water from the aquatic medium and the triggering of the discharge by escape of the effluents in order to produce electrical energy from the main electrical cell $2_{11}$ during a so-called cruise phase.

With reference to FIG. 1a, the auxiliary electrical cell $1_0$ and the main electrical cell $2_{11}$ are controlled sequentially by the command and control module $1_1$ of the electrical propulsion cell located in the first chamber 1 and are connected respectively to a main and secondary electrical energy distribution network.

In a general manner, it is pointed out by way of non-limiting example that the auxiliary cell and the main cell deliver electrical voltages having substantially different nominal values $V'_N$, $V_N$ and they can therefore each be connected respectively to a main and secondary electrical energy distribution network, these networks of course being protected and isolated by diode connections, for example. These connections of the conventional type are not shown in the drawings.

In addition, the auxiliary electrical cell $1_0$ is advantageously formed by a set of thermal cell elements started up by pyrotechnic ignition, for example.

The object of the auxiliary cell $1_0$ is to supply electrical power to the device moving in an aquatic medium during the launch phase in particular, that is to say, at the beginning of the mission of the above-mentioned device, and during a phase in which the device is at a distance from the starting point not exceeding a few hundred metres.

The auxiliary cell $1_0$ thus supplies the energy to the engine for the propulsion of the device moving in an aquatic medium under substantially reduced power and also to all the members of the electrical cell for the propulsion of a device in an aquatic medium, in accordance with the subject-matter of the present invention, as will be described later on in the description.

Therefore, the auxiliary cell $1_0$ may advantageously be formed by four thermal cells connected in two parallel branches of two cells in series, for example.

The two parallel branches are advantageously each isolated by a diode with respect to a reverse voltage which may originate from the main cell or from the other parallel branch constituting the auxiliary cell $1_0$.

Each of the thermal cells making up the auxiliary cell $1_0$ is advantageously ignited by double pyrotechnic ignition by means of an ignition box not shown in the drawings.

In a non-limiting preferred embodiment, a first thermal cell is started up as soon as the device moving in an aquatic medium is launched, on the basis of a signal delivered externally by a system for launching the device moving in an aquatic medium, for example.

The above-mentioned signal, such as a rectangular wave form voltage for a predetermined period, can then enable an electrical capacitance located in the ignition box to be charged. The capacitance is then discharged onto the pyrotechnic igniters of the thermal cell that was subjected to the ignition operation first. The other three thermal cells making up the auxiliary cell $1_0$ are then ignited by the electrical energy supplied by the first thermal cell subjected to the ignition process. This operation is possible as soon as the first thermal cell ignited provides sufficient nominal voltage.

In a non-limiting embodiment, the duration of operation of the auxiliary cell $1_0$ does not exceed three seconds.

In a non-limiting embodiment, the auxiliary cell $1_0$ permits the delivery of a maximum no-load voltage of the order of 250 V for an average power of 45 kW.

The electrical energy delivered by the auxiliary cell $1_0$ is delivered on a main electrical energy distribution network and on a secondary network, which is of course connected in a conventional manner to the device which is to be supplied temporarily by the auxiliary cell $1_0$.

As regards the members for the controlled admission and the regulation of a flow of water from the aquatic medium into the second chamber 2, as shown in FIG. 1a, these advantageously comprise a motor-driven pump unit marked $2_4$, the suction nozzle of which is connected to the valve for the admission of water from the aquatic medium, which valve bears the reference $3_2$ in FIG. 1a, and the outlet nozzle of which delivers the water sucked in from the aquatic medium directly into the second chamber 2 forming a reservoir, in order to form the activation electrolyte and to immerse the main electrical cell $2_{11}$ in the above-mentioned activation electrolyte $2_0$.

As is also shown in FIG. 1a, the suction nozzle $2_5$ of the motor-driven pump unit $2_4$ is connected to the admission valve $3_2$ by way of a pipe $2_1$.

The connection between the suction nozzle $2_5$ and the valve $3_2$ for the admission of water from the aquatic medium by way of the pipe $2_1$ can be effected directly or by means of a flow regulator bearing the reference $2_3$ in FIG. 1a.

The above-mentioned flow regulator $2_3$ enables the rate of admission of water from the aquatic medium into the reservoir formed by the chamber 2 to be regulated in a non-limiting preferred embodiment, as will be described later on in the description.

Furthermore, the members for the controlled admission and the regulation of a flow of water from the aquatic medium into the second chamber 2 advantageously comprise, as shown in FIG. 1a, a thermostatic valve $2_8$ connected to the main electrical cell $2_{11}$. The thermostatic valve $2_8$ regulates the admission of the activation electrolyte $2_0$ into the main cell $2_{11}$ in order to trigger the activation of the main electrical cell by electrochemical reaction, as will be described later on in the description.

Finally, the members for the controlled admission and the regulation of a flow of water from the aquatic medium into the second chamber 2 comprise a device for the circulation of the activation electrolyte and the separation of the effluents thereof.

As shown in a non-limiting manner in FIG. 1a, the device for the circulation of the activation electrolyte and the separation of the effluents advantageously comprises an inlet nozzle $2_{71}$ connected to the internal cavity of the main electrical cell $2_{11}$, the latter containing, in steady state, the activation electrolyte, a first outlet nozzle $2_{72}$ connected in the vicinity of the suction nozzle $2_5$ of the motor-driven pump and a second effluent outlet nozzle $2_{73}$ which is connected by way of a pipe $2_2$ to the discharge valve $3_3$ located in the third chamber 3.

In addition, as shown in a non-limiting manner in FIG. 1a, the second outlet nozzle $2_{73}$ of the device for circulation and separation is connected to the effluent discharge valve $3_3$ located in the third chamber 3 by means of a mode valve marked $2_6$ which permits the orientation, in a first position, of the effluents towards the effluent discharge valve $3_3$, when the main electrical cell is started up during the launch phase, and, respectively, in a second position, of the activation electrolyte towards the suction nozzle $2_5$ of the motor-driven pump, in order to generate closed-loop circulation of the activation electrolyte $2_0$ in the main electrical cell during the cruise phase.

Finally, the thermostatic valve $2_8$ is advantageously formed by a three-way valve receiving at least on one of the paths a direct flow FD of activation electrolyte $2_0$ drawn from the second chamber 2 forming a reservoir and on a second path a derivative flow of activation electrolyte passing by way of a heat exchanger $2_9$, the above-mentioned derivative flow Fd of activation electrolyte being maintained at a substantially constant temperature by the heat exchanger.

The thermostatic valve $2_8$ delivers on a third path from the direct flow and the derivative flow at a substantially constant temperature acting as a reference temperature a flow of thermostatically-controlled activation-electrolyte marked $2_{10}$ at a substantially constant temperature to the internal cavity of the main electrical cell $2_{11}$.

The operating mode of the members for the controlled admission and the regulation of a flow of water from the aquatic medium into the second chamber and in particular the device for the circulation and separation of the activation electrolyte and the effluents is as follows:
the set of elements making up the above-mentioned members is basically intended to regulate the thermal equilibrium of the main cell $2_{11}$ and of course to evacuate the effluents. This regulation is effected by the circulation of the activation electrolyte of the main cell, the operation of which is as follows:
the motor-driven pump unit $2_4$ pressurizes the reservoir, that is to say, the whole of the second chamber 2 in which the electrolyte is stored.

The circulation of the activation electrolyte is then established by means of the thermostatic valve $2_8$ which, thanks to its three-way circuit, enables the direct flow FD coming from the reservoir formed by the chamber 2 and the derivative flow Fd passing by way of the heat exchanger $2_9$ to be mixed.

The resulting electrolyte mixture, i.e. the flow of activation electrolyte $2_{10}$, is then at a substantially constant temperature owing to the operation of the thermostatic valve $2_8$ which enables the reference temperature given by the derivative flow Fd passing through the heat exchanger $2_9$ to be maintained by adjusting the incoming flows.

The flow of activation electrolyte $2_{10}$ is then delivered to the internal members of the main cell $2_{11}$ of the electrochemical type in order to irrigate the internal members thereof at a rate of flow controlled by the motor-driven pump unit $2_4$.

Specifically, the main cell $2_{11}$ is advantageously constituted by a stack of electrochemical couples irrigated by the flow of thermostatically-controlled activation electrolyte $2_{10}$ in order to bring about the chemical reaction of the cell which enables the corresponding electrical energy to be generated.

On leaving the main cell $2_{11}$, the activation electrolyte is collected in order to be routed by the inlet nozzle $2_{71}$ of the effluent separator $2_7$.

The effluent separator may advantageously be constituted by a gas separator based on the principle of centrifugation, as a function of the type of electrochemical reaction brought into play in the main cell $2_{11}$.

The gas separator thus separates two phases, a first liquid phase corresponding to the recycled activation electrolyte sent back to the motor-driven pump unit $2_4$ by means of the mode valve $2_6$ and a second gaseous phase which is discharged to the aquatic medium by way of the pipe $2_2$ and the effluent discharge valve $3_3$.

It will thus be appreciated that the function of the mode valve $2_6$ is to switch the flow of recycled activation electrolyte either to the motor-driven pump unit $2_4$ during closed-circuit operation of the assembly in the course of the cruise phase, or, where appropriate, to an evacuation to the aquatic medium at the end of the mission, for example, in particular during a mission of a non-destructive nature, by means of the discharge valve $3_3$.

It will of course be appreciated that the mode valve $2_6$ is controlled by the command and control module $1_1$ of the electrical propulsion cell, as will be described in more detail later on in the description.

A non-limiting preferred embodiment of the assembly of the electrical cell for the propulsion of a device in an aquatic medium, to which the present invention relates, will now be given in conjunction with FIG. 1a and FIG. 1b when the main electrical cell of the electrochemical type is an Ago—Al cell.

Under the above-mentioned conditions, the electrical propulsion cell comprises a main electrical cell $2_{11}$ of the electrochemical type formed by an electrochemical block constituted by a stack of AgO—Al electrochemical couples located in the cavity of a sealed shell module $2_{11a}$. The above-mentioned sealed module comprises, for example, a plurality of electrochemical couples $2_{11b}$ which are connected in parallel and which of course permit the circulation of the flow of thermostatically-controlled activation electrolyte $2_{10}$.

As shown in FIG. 1a, the sealed module is connected, on the one hand, to the thermostatic valve $2_8$ at the base of the sealed module $2_{11a}$ and, on the other hand, to the device $2_7$ for the circulation of the electrolyte and for the separation of effluents, at the inlet nozzle $2_{71}$ of the latter.

The main electrical cell of the electrochemical type is also formed by a reserve of anhydrous sodium hydroxide, the electrochemical block and the anhydrous sodium hydroxide being located in the second chamber 2 forming a reservoir. In FIG. 1*a*, the reserve of anhydrous sodium hydroxide has been represented by crystals represented by crosses, which crystals are not completely diluted in the water from the aquatic medium admitted into the chamber 2.

On the admission of water from the aquatic medium, the triggering of the activation of the main electrical cell brings into play, with the AgO—Al electrochemical couples, the anhydrous sodium hydroxide and the water, a main electrochemical reaction:

$$2Al+3AgO+2NaOH+3H_2O \to 3Ag+2NaAl(OH)_4+2kCal,$$

a parasitic corrosion reaction:

$$2Al+2NaOH+2H_2O \to 2NaAlO2+3H2+200 \text{ kCal}.$$

Under these conditions of electrochemical reaction, the effluents are formed by hydrogen gas $H_2$.

In a non-limiting manner, it is pointed out that the anhydrous sodium hydroxide reserve is advantageously constituted by a mixture of micropellets of anhydrous sodium hydroxide and powder-form stannates charged in bulk into the second chamber forming a reservoir.

The operating mode of the assembly will now be described taking into account the advantageous, but not indispensable, use of the flow regulator $2_3$.

At the time when the cell is activated, that is to say, at the time when the opening of the admission valve $3_2$ is triggered, after the phase of launching the device, the admission valve $3_2$ and the flow regulator $2_3$ for the admission of water from the aquatic medium permit the inflow of water from the aquatic medium towards the reservoir formed by the second chamber 2.

By dissolution, this brings about the formation of the activation electrolyte. The flow regulator $2_3$ intervenes in order to control the incoming flow of water, regardless of the activation immersion of the device and of course of the cell for the propulsion of a device in an aquatic medium.

The admission valve $3_2$ thus ensures the sealing of the reservoir 2 formed by the second chamber 2 during all of the phases of cell storage, including during the launch phase, as will be described later on in the description.

When the whole of the system is started up and the stabilized circulation of the activation electrolyte is established, as described above in the description, the equilibrium of the pressures with respect to the external aquatic medium is the following:

the reservoir formed by the second chamber 2 is pressurized by the pump $2_4$;

the inlet nozzles of the thermostatic valve $2_8$ and of the heat exchanger $2_9$ are subjected directly to the above-mentioned pressure;

the inlet of the main cell or more particularly of the sealed block $2_{11a}$ forming the electrochemical block is pressurized by the output pressure of the thermostatic valve $2_8$, which is equal to the pressure of the chamber 2 forming a reservoir, reduced by the drop in pressure brought about by the thermostatic valve $2_8$.

Consequently, the internal cavity of the main cell $2_{11}$ and of the sealed shell module $2_{11a}$ forming the latter is subjected as a whole externally to a relative pressure at least equal to the pressure drop 2 brought about by the thermostatic valve $2_8$. This condition ensures correct operation of the main electrical cell because the above-mentioned pressure ensures good contact of the stack of electrodes constituting the electrochemical couples, and also good internal electrical conductivity.

The input pressure of the gas separator device $2_7$ is reduced by the pressure drop introduced by the stack of electrochemical couples $2_{11b}$.

The second outlet $2_{73}$ of the effluent or gas separator $2_7$ is at a pressure substantially close to that of the aquatic medium and a non-return valve permits a slight drop in pressure, for example.

The outlet nozzle for recycled activation electrolyte $2_{72}$ of the gas or effluent separator device $2_7$ is at a pressure substantially close to the pressure for the suction of water from the aquatic medium. Passage through the mode valve $2_6$ and also a non-return valve enable a slight drop in pressure to be obtained. At the inlet of the motor-driven pump unit, the connection towards the aquatic medium opened by the admission valve $3_2$ at start-up remains open in order, by drawing in water from the aquatic medium, permanently to balance the variations in the internal volume of the cell, in particular of the chamber 2 forming a reservoir. The above-mentioned variations in internal volume are due in particular to an initial degassing of the system in a purging stage prior to the admission of water from the aquatic medium, and due to the volume compensation brought about by the erosion of the electrodes formed by the electrochemical couples which is caused by the electrochemical reactions. The outlet of the mode valve $2_6$ and the outlet of the flow regulator $2_3$ thus meet at the suction nozzle $2_5$ of the motor-driven pump unit $2_4$. This joining is effected in a connecting region subjected to the immersion pressure in the chamber 2 forming a reservoir.

All of the command and control functions of the cell are carried out by means of the command and control module $1_1$ mentioned above in the description.

More specifically, the above-mentioned module $1_1$ ensures the following functions:

control of the functions of the cell on the basis of the data coming from the control and guide section (not shown) of the device;

transmission of the cell operating parameters to the above-mentioned control and guide section;

regulation of the motor-driven pump $2_4$ by means of an electronic unit $3_1$ located in the third chamber 3.

The above-mentioned operating mode will now be described in conjunction with FIG. 1*b* at points 1, 2 and 3 thereof, for various members making up the assembly shown in FIG. 1*a*.

In particular, the above-mentioned operating mode is described when the admission valve $3_2$ is provided with which is associated a start-up valve $3_5$ which is itself controlled by a pressure reference formed by a pre-positioning valve $3_6$ and when, in addition, a flow regulator $2_3$ is mounted on the pipe $2_1$ for connecting the admission valve $3_2$ and the suction nozzle $2_5$ of the motor-driven pump unit $2_4$.

The admission valve $3_2$ opens the chamber 2 forming a reservoir to the aquatic medium. To be more precise, it permits the entry of water from the aquatic medium into the reservoir, the incoming flow of water being directed towards the flow regulator $2_3$ and then towards the motor-driven pump unit $2_4$.

The effluent discharge valve $3_3$ is coupled to the admission valve $3_2$ in order to ensure that the effluent or gas separator device $2_7$ is brought into communication with the aquatic medium.

The admission valve $3_2$ and the effluent discharge valve $3_3$ are fixedly joined, being located diametrically opposite each other on the periphery of the cell body 0 in a longitudinal plane of symmetry of the latter, and they advantageously have an identical opening cross-section, so that the forces due to the pressure of immersion in the aquatic medium are balanced out at every instant. The admission valve $3_2$ is controlled by a pyrotechnic activator, for example. It also comprises a start-up valve $3_5$ permitting the opening to the aquatic medium of a duct which enables the flow regulator $2_3$ to be positioned at the immersion pressure. The start-up valve $3_5$ can be controlled by means of a pyrotechnic activator. The pyrotechnic control of the start-up valve $3_5$ and the admission valve $3_2$ is effected by means of the command and control module $1_1$ with a specific time lag.

The pyrotechnic control of the admission valve $3_2$ acts on a mechanical device which releases a biasing spring. The assembly formed by the admission valve $3_2$ and the effluent discharge valve $3_3$, which are connected by the synchronized control $3_4$ formed basically by a central rod, moves as far as a mechanical stop. The orifice for the admission of water from the aquatic medium is then open while the orifice for the discharge of the effluents or gases remains closed owing to the action of the external pressure on a valve. The above-mentioned device prevents the entry of water from the aquatic medium via the outlet of the effluent discharge valve $3_3$ during the start-up phase.

When the second chamber 2 forming a reservoir has been substantially filled, a protective cover arranged at the inlet to the thermostatically controlled activation electrolyte $2_{10}$ delivered by the thermostatic valve $2_8$ is then opened, the recycled electrolyte subsequently leaves the effluent or gas separator $2_7$ and an internal pressure occurs in the main cell $2_{11}$, which pressure is close to that of the water from the aquatic medium. The degassing flap of the effluent discharge valve $3_3$ can then be opened by the action of the spring $3_{30}$ shown in the drawing. Once open, the flap does not cause any drop in pressure in the degassing circuit.

The start-up valve $3_5$ and the admission valve $3_2$ each comprise a limit stop contact which indicates their state of activation. The signals of the above-mentioned limit stop contact are sent back to the command and control module $1_1$ which monitors the whole of the start-up operation.

The flow regulator $2_3$ is intended to limit the flow of water from the aquatic medium admitted into the second chamber 2 by adjusting a passage cross-section adapted to the immersion pressure.

The operating mode of the above-mentioned regulator consists in obstructing the maximum flow cross-section of the diameter of the duct for supplying water from the aquatic medium by the displacement of a slide valve equipped with calibrated orifices. The above-mentioned flow regulator $2_3$ is installed in the reservoir. It is connected between the admission valve $3_2$ and the suction nozzle $2_5$ of the motor-driven pump $2_4$.

The start-up valve $3_5$ applies the immersion pressure to the slide valve of the regulator by way of a duct for an external pressure reference RPE. The above-mentioned slide valve then occupies an equilibrium position imposed by a spring. The displacement of the slide valve is proportional to the pressure applied. The passage cross-section for the water from the aquatic medium is thus partially closed and the flow is then pre-adjusted within a range of values of from 10 to 15 litres/second.

At the end of the filling operation, when the pressure in the second chamber 2 forming a reservoir is higher than that of the aquatic medium, the regulator re-assumes a completely open position. This later permits an operation in which it is easy to rinse the cell during the performance of a non-destructive mission, for example.

The flow regulation is provided for exterior pressures of the aquatic medium corresponding to immersion depths of from 10 to 350 metres. The adjustment can be carried out for different, lower and/or higher, values. The flow regulator $2_3$ comprises an input pressure tap forming a pressure reference of the exterior aquatic medium RPE for the assembly.

The thermostatic valve $2_8$ is located at the lower portion of the sealed shell $2_{11a}$ forming the main cell. It is located in the vicinity of the irrigation orifices of the electrochemical couples $2_{11b}$ constituting the above-mentioned main cell and thus ensures the entry of the flow of thermostatically controlled activation electrolyte $2_{10}$ at a substantially constant temperature which may be from 80 to 98° C., for example.

The thermostatic valve $2_8$ operates on a purely mechanical principle. It uses a thermostatic probe to control the position of a slide. Depending on the position of the latter, the slide uncovers passage holes at the hot inlet and the cold inlet so that the mixture irrigating the probe is constantly at a defined temperature.

The above-mentioned thermostatic valve $2_8$ is equipped at the outlet with a protective cover $2_{80}$ which can be snapped shut at a predetermined pressure value of the order of 3.0 bar, this protective cover keeping the internal cavity of the electrochemical block closed as long as the pressure in the reservoir is not sufficient.

The thermostatic valve $2_8$ is equipped with a filter surrounding the hot inlet orifices of the reservoir. Under these conditions, particles of sodium hydroxide having a size greater than a predetermined value of the order of 300 microns are stopped, while the flow leaving the pump permits permanent unclogging of the filter.

The thermostatic valve $2_8$ comprises a temperature probe whose measurement is conditioned by the command module of the electrical propulsion cell $1_1$. It also comprises a pressure tap RPBEI at the inlet to the sealed shell $2_{11a}$ a of the main electrical cell, this pressure tap being intended for a pressure sensor $CP_6$ enabling the mode valve $2_6$ to be controlled, as will be described later on in the description.

The nominal regulation temperature maintained by the thermostatic valve for operation of the cell at maximum power and for a low immersion pressure, is close to 95° C. while, for a high degree of immersion, the drift of the probe permits operation up to approximately 98° C.

The effluent or gas separator $2_7$ collects the activation electrolyte leaving the electrochemical block at the upper portion of the sealed shell $2_{11a}$ forming that block. It separates the gases or effluents by a cyclone effect as soon as the state of electrolyte circulation is established. It is installed in the reservoir formed by the chamber 2 and composed of a metal, such as stainless steel, in order to ensure good heat conduction and that the activation electrolyte subjected to the phenomenon of effluent separation is maintained at a temperature close to that of the activation electrolyte which is contained in the reservoir but which is not subjected to the phenomenon of effluent separation.

During the start-up phase, the effluent or gas separator $2_7$ transfers the effluents or gases from the electrochemical block to the effluent discharge valve $3_3$ owing to the position of the mode valve $2_6$ which blocks the normal liquid return from the degasser to the motor-driven pump $2_4$.

Connected between the outlet of the electrochemical block and the inlet of the gas effluent separator device $2_7$ is a suction tube which enables the gases that have remained trapped in the second chamber 2 forming a reservoir to be evacuated. This operating mode is permitted owing to the fact that the pressure in the reservoir is higher than that at the inlet to the gas separator device $2_7$. During the cruise phase, this degassing tube provides for leakage inside the system, which leakage is very slight and entirely acceptable, while at the same time ensuring the possible evacuation of gases which may settle in the second chamber 2 forming a reservoir.

The outlet nozzle $2_{73}$ of the gas separator device $2_7$ is connected to the effluent or gas discharge valve $3_3$ through the sealed tube $2_2$ and a valve. The above-mentioned tube enables the cell to be rinsed at a rate of the order of 3 litres/second.

The outlet nozzle of the effluent or gas separator device $2_7$ delivering the recycled activation electrolyte in the vicinity of the suction nozzle $2_5$ of the motor-driven pump is connected to the latter by means of the mode valve $2_6$. When the mode valve $2_6$ is in the closed position, that is to say, during start-up and during the rinsing of the electrical cell for the propulsion of a device in an aquatic medium, to which the invention relates, the whole of the flow is oriented in the mode valve $2_6$ towards the effluent or gas outlet. When the mode valve $2_6$ is open, the liquid of the degasser passes through the above-mentioned mode valve and is sucked in by the pump by means of the suction nozzle $2_5$ thereof.

The inlet of the gas or effluent separator device $2_7$ also comprises a temperature probe $CT_7$ which is identical to the inlet temperature probe $CT_8$ located on the thermostatic valve $2_8$ and also a pressure tap enabling the output pressure of the electrochemical block, also referred to as RPBEO, to be delivered. This pressure tap enables the operating mode of the cell to be managed by the command module $1_1$.

Finally, the mode valve $2_6$ is advantageously constituted by a three-way valve having two stable open and closed positions and comprising a slide controlled by an actuating pressure balanced by a spring. It comprises two simple two-way solenoid valves EV1 and EV2 enabling the application of the actuating pressure to the above-mentioned slide to be managed.

The solenoid valve EV1 connects the tap for immersion pressure RPE of the flow regulator $2_3$ to the chamber of the mode valve $2_6$. The solenoid valve EV1 is a valve which is normally open in the absence of electrical power.

The solenoid valve EV2 connects the input pressure tap of the electrochemical block, that is to say, the output pressure of the thermostatic valve $2_8$, also referred to as RPVT, to the chamber of the mode valve $2_6$. The solenoid valve EV2 is a valve which is normally closed.

The mode valve $2_6$ enables the activation electrolyte leaving the outlet nozzle $2_{72}$ of the gas effluent separator device $2_7$ to be oriented in accordance with two paths corresponding to operating modes of the cell:

in the upper or closed position, no pressure is applied to the mode valve $2_6$. Under these conditions, the mode valve $2_6$ orients the effluent flows towards the gas discharge valve $3_3$. This mode of operation takes place during start-up in order to purge the gases to the aquatic medium, and at the end of the mission, during the rinsing of the cell in the case of a non-destructive mission.

in the lower or open position, the mode valve $2_6$ receives the actuating pressure which positions its slide in the lower position and it orients the electrolyte towards the inlet of the motor-driven pump, i.e. the suction nozzle $2_5$, so that the activation electrolyte circulates in a closed loop in the cell.

The two solenoid valves EV1 and EV2 are completely controlled by the command module $1_1$. According to the scheme shown at point 3 in FIG. 1b:

during the activation phase, that is to say, the phase of launching the device, the valve EV1 is supplied with power and therefore closed, which prevents the input pressure of the flow regulator $2_3$ from acting on the slide of the mode valve $2_6$. On the other hand, the solenoid valve EV2 is not supplied with power and is therefore closed, while waiting for a command signal delivered by the command module $1_1$. Under these conditions, the mode valve $2_6$ is not under stress and remains in the upper or closed position. It will be appreciated that the supply of electrical energy to the solenoid valve EV1 by the auxiliary cell $1_0$ is permitted as of the initial start-up thereof;

at the end of the operation of filling the reservoir formed by the second chamber 2, when the pressure conditions are detected, the solenoid valve EV2 is supplied with power, which enables the input pressure of the electrochemical block, that is to say, the input pressure RPVT, to be applied to the slide of the mode valve $2_6$. The slide tilts and therefore enables the recycled activation electrolyte coming from the effluent or gas separation device $2_7$ to pass to the pump $2_4$. The solenoid valve EV1 for its part remains closed.

At the end, for example, of a non-destructive mission, the supply of power to the first solenoid valve EV1 is cut, which decompresses the chamber of the mode valve $2_6$ and enables the slide to go back up to the upper position. The activation electrolyte is then evacuated by way of the effluent or gas outlet, that is to say, by way of the effluent discharge valve $3_3$. At the same time, the supply of power to the solenoid valve EV2 is cut, which then prevents the input pressure of the electrochemical block, that is to say, the pressure RPVT, from acting on the slide of the mode valve $2_6$.

The solenoid valves EV1 and EV2 are controlled by the above-mentioned command and control module $1_1$ which operates on the basis of the pressure data coming from the pressure taps below:

tap for reservoir pressure;
tap for immersion pressure RPE;
tap for the output pressure RPBEO of the electrochemical block.

Two differential pressure sensors which are not shown in the drawing enable the following data to be supplied to the command and control module $1_1$ from the above pressure taps:

the difference between the reservoir pressure and the immersion pressure indicates the state of operation of the circulation loop. This difference in pressure must tally with the state of the cell and with the flow control of the pump;

the difference between the output pressure of the electrochemical block and the immersion pressure indicates the filling state of the cell.

The operating mode and the control of the second solenoid valve EV2 by the command module $1_1$ which brings about the switching of the mode valve $2_6$ are effected on the basis of the following criteria:

the difference in pressure between the outlet of the electrochemical block and the aquatic medium;
the monitoring of the electrical voltage delivered by the electrochemical block;
the monitoring of the output temperature of the electrochemical block;
the chronology of start-up.

By way of summary, the control logic of the mode valve $2_6$ through the supply of electrical power for controlling the two solenoid valves EV1 and EV2 is given hereinafter in accordance with the following Table:

| | | |
|---|---|---|
| 1. Initial state | EV1 = 0 | EV2 = 0 |
| 2. As soon as the thermal cell voltage is OK | EV1 = 1 | EV2 = 0 |

-continued

| | | | |
|---|---|---|---|
| 3. As soon as pressure "output BE-immersion" is OK | | EV1 = 1 | EV2 = 1 |
| 4. As soon as the order to stop reaches the module $1_l$ | | EV1 = 0 | EV2 = 0 |

In addition, the lower position of the slide of the mode valve $2_6$ is detected by means of a magnetic sensor $CM_6$ and is acquired by the command and control module $1_1$.

Figure 1B:
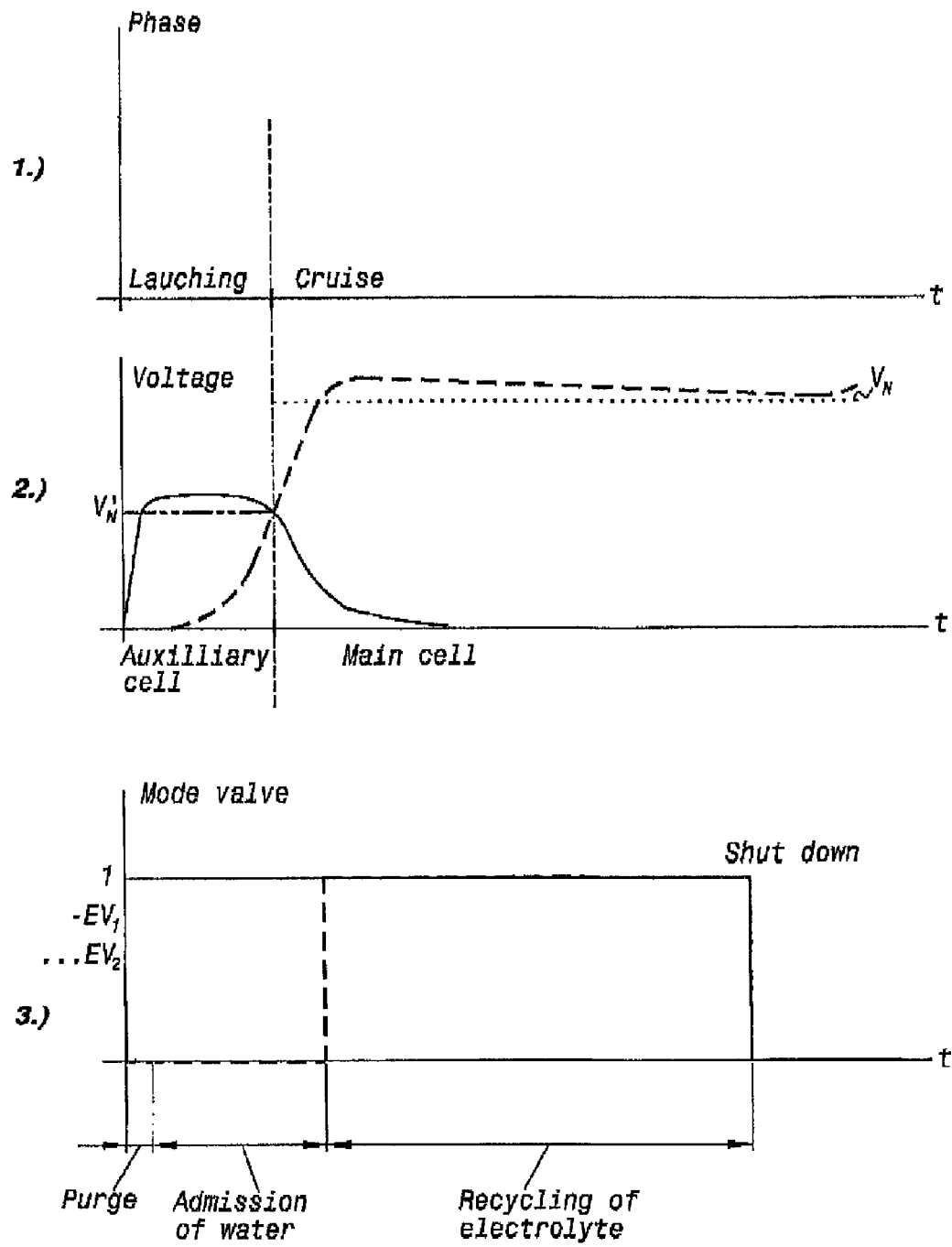
FIG. 1b shows purely by way of illustration various signal timing diagrams representing a specific operating mode of the electrical cell for the propulsion of a device in an aquatic medium, to which the present invention relates.

The operating mode of the assembly is represented with reference to points 1), 2) and 3) of FIG. 1b in which:
  represented at point 1) are the launch and cruise phases, respectively, of the device; the launch phase may last a few seconds or a few tens of seconds and the cruise phase may last several tens of minutes;
  represented at point 2) is the graph of the voltages delivered by the auxiliary cell and the main electrical cell, respectively, it being understood that the nominal voltage V'N of the auxiliary cell of the order of 165 V is substantially different from that of the main electrical cell 245 V, for example.
  Represented at point 3) is the control of the two solenoid valves V1 and V2 constituting the mode valve $2_6$ according to the above Table.

As regards the motor-driven pump $2_4$, this pump ensures the circulation and recycling of the activation electrolyte at a variable flow rate. It may be constituted by a centrifugal pump immersed in the electrolyte reservoir and by a likewise immersed motor. The motor is a motor of the type whose speed is controlled as a function of the pumping requirement. The electronic control system of the motor is denoted by the unit $3_1$ and located in the chamber 3, for example.

The supply of power to the pump motor is advantageously effected from the main electrical network of the main cell at 400 V while the supply of power to the electronic control system may be effected on the auxiliary circuit of the cell at 200 V. In particular, when the main cell has taken over from the auxiliary cell, the secondary network may be supplied with power from the half-voltage delivered by the main cell.

Finally, the motor-driven pump $2_4$ is controlled in terms of speed by the command module $1_1$ by means of a series RS422 connection of the conventional type.

The motor-driven pump may be controlled in accordance with discrete operating states with incremental flow.

The motor-driven pump $2_4$ provides data relating to:
  absorbed current;
  rate of rotation;
  temperature of the circuits for supplying power to IGBT converters (Insulated Gate Bipolar Transistor);
  self-test evaluation.

The starting of the motor-driven pump $2_4$ is controlled by the command and control module $1_1$ as soon as the latter receives the contact signal provided by the opening of the admission valve $3_2$.

A more detailed description of the structure of the electrical cell for the propulsion of a device in an aquatic medium and of a method of using that structure in accordance with the subject-matter of the present invention will now be given hereinafter.

As shown in FIG. 1a, the sealed cell body 0 is advantageously formed by an assembly of elements constituted at least by a front collar $0_1$ and a front end $0_2$ of the main electrical cell, the front collar $0_1$ and the front end $0_2$ forming the third chamber 3 mentioned above.

The sealed cell body 0 also comprises a central shell $0_3$ and a rear end $0_4$, the front end $0_2$, the central shell $0_3$ and the rear end $0_4$ forming the second chamber 2 constituting the reservoir.

Finally, the sealed cell body 0 comprises a rear collar $0_5$, the rear end $0_4$ and the rear collar $0_5$ constituting the first chamber 1.

As also shown in FIG. 1a, the central shell $0_3$ at least is constituted by a metal alloy which is a good heat conductor.

A portion at least of the central shell $0_3$ which is located in the vicinity of the main electrical cell $2_{11}$ and in particular of the electrochemical block forming that cell constitutes the heat exchanger with the aquatic medium and in particular the heat exchanger $2_9$ for at least the derivative flow of activation electrolyte.

It can be seen in FIG. 1a that the derivative flow of activation electrolyte is generated by the pressure produced by the motor-driven pump $2_4$ in a gap $2_{91}$ formed at the lower portion of FIG. 1a, between the wall of the central shell $0_2$ and a metal wall fixedly joined to the thermostatic valve $2_8$, and finally to the sealed body $2_{11a}$ forming the electrochemical block $2_{11}$. The above-mentioned gap $2_{91}$ permits the generation of the derivative flow of activation electrolyte at a substantially constant temperature acting as the reference temperature for the above-mentioned thermostatic valve $2_8$.

Preferably, the front collar $0_1$, the front end $0_2$ of the electrical cell, the central shell $0_3$ and the rear end $0_4$ and also the rear collar $0_5$ are composed of a metal material. The external face thereof which is to be in contact with the aquatic medium is advantageously provided with a protective anti-corrosion layer obtained by hard anodic oxidation.

As regards the central shell $0_3$, it should be mentioned that this shell, between the front end and the rear end, is formed in a single piece and has no opening at the periphery in order to ensure that the assembly is sealed during all of the phases of storing the cell for the propulsion of a device in an aquatic medium according to the subject-matter of the present invention. This specific design enables double sealing of the reservoir formed by the second chamber 2 with respect to the external aquatic medium to be put in place at the joints with the front end $0_2$ and the rear end $0_4$.

As shown in FIG. 1a, the cell body and, in particular, the second chamber 2, is provided with a double sealing barrier with respect to the external aquatic medium.

A first sealing barrier, marked $B_1$, is formed by a seal between the aquatic medium and the first chamber, and the third chamber, respectively, and a second sealing barrier, $B_2$, is formed by a seal between the first and second chamber and the second and third chamber, respectively. The above-mentioned sealing barriers are represented by specific hatching in FIG. 1a.

Finally, the internal face of the central shell $0_3$, except for the portion forming the heat exchanger $2_9$, also comprises a thermally insulating coating at the portion forming a reservoir for the activation electrolyte. The purpose of this thermally insulating coating is to reduce the cooling of the stored activation electrolyte by heat exchange with the aquatic medium during the cruise phase. This thermally insulating coating may be constituted by a coating of the epoxy resin type, for example.

In addition, the internal face of the front end $0_2$ of the electrical cell of the central shell $0_3$ and of the rear end $0_4$ of the electrical cell constituting the second chamber 2 forming a reservoir comprises a chemical nickel coating for protection against corrosion by the anhydrous sodium hydroxide.

The sealing of the second chamber 2 forming a reservoir may then be managed in the following manner:

the reservoir is the portion of the electrical cell for the propulsion of a device in an aquatic medium according to the subject-matter of the present invention that comprises the active components of the cell, in particular the sodium hydroxide and the electrochemical block. For this reason, the elements making up the above-mentioned reservoir have been organized in such a manner that, together, they have total sealing in respect of storage in water from the aquatic medium owing to the two sealing barriers B1 and B2 mentioned above which are formed by specific seals.

In the case of inadvertent immersion, in particular of the reservoir portion, no electrochemical material is in contact with the water from the aquatic medium. Two water detectors, one located at the front and the other located at the rear, that is to say, in the chambers 1 and 3, for example, are connected by specific wiring, on the one hand, to the command and control module $1_1$ and, on the other hand, to the external launch system, which can thus monitor the safety of the cell before the device is launched.

The second sealing barrier B2 ensures the integrity of the reservoir function with respect to the external aquatic medium.

A pressure switch, which is not shown in the drawing, may be provided in order to permit permanent control of the sealing of the mode valve $2_6$. The above-mentioned pressure switch is connected between the two seals of the mode valve $2_6$, on the one hand, on the water inlet portion, that is to say, on the outlet nozzle $2_{72}$ of the effluent or gas separator $2_7$ to which the above-mentioned mode valve $2_6$ is connected, and, on the other hand, on the gas outlet portion $2_{73}$ of the above-mentioned separator $2_7$. The double sealing barrier B1 and B2 equipped with the above-mentioned water and pressure detectors ensures a high level of reliability in terms of the sealing of the electrical cell for the propulsion of a device in an aquatic medium to which the present invention relates.

Finally, the front collar $0_1$ and the rear collar $0_5$ have, as shown in FIG. 1$a$, a distal end which is open with respect to the front end $0_2$ and the rear end $0_4$, respectively, of the cell. This embodiment enables the electrical propulsion cell to which the invention relates to be constructed in the form of an independent module which can be stored as a substantially inert component with its charge of anhydrous sodium hydroxide reserve when the electrical propulsion cell is not mounted with the device, and also in the form of an element integrated directly in the body of the device in the opposite case. To that end, in a non-limiting embodiment, the front collar $0_1$, the central shell $0_3$ and the rear collar $0_5$ advantageously have a substantially cylindrical cross-section of revolution. The above-mentioned shape is particularly suitable for integration in the body of the device when that device is constituted by a torpedo, for example, or by an underwater observation device. In this situation, the distal end of the front collar is secured mechanically and coupled electrically to the active portion of the device and the distal end of the rear collar is secured mechanically and coupled electrically to the propulsive and control rear portion of the device in order to constitute an electrical propulsion cell which can be activated as soon as the device is launched in the aquatic medium.

It will be appreciated in particular that the assembly represented in FIG. 1$a$ comprises wire connections by cables and/or by buses, as mentioned above, between the first chamber 1, the second chamber 2 and the third chamber 3, although these connections as a whole are not all represented in the drawings.

Under these conditions, the cell for the propulsion of a device in an aquatic medium according to the subject-matter of the present invention comprises temperature sensors for the flow of activation electrolyte entering and leaving the main electrical cell, in order to be able to regulate the temperature of the flow of activation electrolyte by means of the thermostatic valve $2_8$.

The cell also comprises sensors for sensing the relative pressure of the activation electrolyte in the second chamber 2 forming a reservoir for that same activation electrolyte at the inlet of the device $2_7$ for the circulation of the activation electrolyte and for the separation of the effluents, these sensors of relative pressure delivering a relative pressure with respect to the pressure outside the sealed cell body, that is to say, with respect to the pressure reference RPE mentioned above in the description.

Finally, the cell comprises a plurality of contacts or of detection of a contact for sealing the valve $3_2$ for the admission of water from the aquatic medium, a contact for opening the valve for the admission of water to the above-mentioned sealed cell body $2_{11a}$. Of course, all of these sensors and/or contacts are connected by suitable connections provided with sealed bushes in a manner known per se.

Sealed electrical power bushes such as shown in FIG. 1$a$ under the references $1_2$ and $1_3$ connect the auxiliary cell $1_0$ to the set of elements contained in the second chamber 2 forming a reservoir and the third chamber 3 or front chamber for supplying electrical power to the electronic module $3_1$ of the motor-driven pump $2_4$, the sealed electrical bush $1_3$ being connected directly to the electrochemical block and in particular to the electrochemical couples in order to deliver the electrical power energy to the propulsion unit of the device carrying the electrical cell for the propulsion of a device in an aquatic medium according to the subject-matter of the present invention. The propulsion energy is supplied by means of a power connector provided with an intensity sensor CI as shown in the drawing of FIG. 1$a$.

The invention claimed is:

1. An electrical propulsion cell for the propulsion of a movable device in an aquatic medium, comprising, in a sealed body:

a first chamber forming a housing comprising an auxiliary electrical cell and a command and control module for the electrical propulsion cell;

a second chamber forming a reservoir comprising a main electrical cell of the electrochemical type, said second chamber being provided with members for controlled admission and regulation of a flow of water from the aquatic medium into said second chamber to form an activation electrolyte for activating said main electrical cell after a command to admit water from the aquatic medium; and a third chamber forming a second housing comprising a module for triggering the admission by suction of water from the aquatic medium and a discharge by escape of effluents resulting from a chemical reaction of the main electrical cell into the aquatic medium, from an admission valve and an escape valve, respectively, which are mounted in said third chamber, said command and control module of the electrical propulsion cell programmed to permit an activation of said auxiliary electrical cell in order to generate electrical energy temporarily during a stage of launching said movable device in the aquatic medium, and a triggering of the admission by suction of water from the aquatic medium and of the discharge by escape of effluents in order to produce electrical energy from said main electrical cell during a cruise phase, wherein the auxiliary electrical cell is configured to directly supply electrical energy to an engine for the propulsion of the movable device and all other members of the electrical propulsion cell during the stage of launching.

2. The electrical propulsion cell according to claim 1, wherein said auxiliary and main electrical cells are controlled sequentially by said command and control module of the electrical propulsion cell and are connected respectively to a main and secondary electrical energy distribution network.

3. The electrical propulsion cell according to claim 1, wherein said auxiliary electrical cell is formed by a set of thermal cell elements started up by pyrotechnic ignition.

4. The electrical propulsion cell according to claim 1, wherein said members for the controlled admission and the regulation of the flow of water from the aquatic medium into said second chamber comprise:
- a motor-driven pump unit, a suction nozzle of said pump unit is connected to said admission valve, and an outlet nozzle of said pump unit delivers the water sucked in from the aquatic medium directly into said second chamber, in order to form said activation electrolyte and to immerse said main electrical cell in the activation electrolyte;
- a thermostatic valve connected to said main electrical cell, said thermostatic valve regulating admission of said activation electrolyte into said main electrical cell in order to trigger the activation of said main electrical cell by electrochemical reaction; and
- a device for circulation of the activation electrolyte and separation of the effluents, said device for circulation of the activation electrolyte and separation of the effluents comprising an inlet nozzle connected to an internal cavity of said main electrical cell, containing the activation electrolyte, a first outlet nozzle connected in a vicinity of the suction nozzle of the motor-driven pump and a second effluent outlet nozzle connected to said escape valve located in said third chamber.

5. The electrical propulsion cell according to claim 4, wherein said second effluent outlet nozzle of said device for circulation of the activation electrolyte and separation of the effluents is connected to said escape valve located in said third chamber by means of a mode valve which permits a first orientation of the effluents towards the escape valve when the main electrical cell is started up during the stage of launching, and permits a second orientation of the activation electrolyte towards the suction nozzle of the motor-driven pump, in order to generate a closed-loop circulation of the activation electrolyte in the main electrical cell during the cruise phase.

6. The electrical propulsion cell according to claim 4, wherein said thermostatic valve is formed by a three-way valve receiving:
- a direct flow of the activation electrolyte drawn from said second chamber, and
- a derivative flow of the activation electrolyte passing by way of a heat exchanger, the derivative flow being maintained at a substantially constant temperature by said heat exchanger, said thermostatic valve delivering, from said direct flow and said derivative flow at the substantially constant temperature acting as a reference temperature, a flow of thermostatically-controlled activation electrolyte at a second substantially constant temperature to the internal cavity of said main electrical cell.

7. The electrical propulsion cell according to claim 4, wherein said main electrical cell of the electrochemical type is an AgO—Al cell.

8. The electrical propulsion cell according to claim 7, wherein said main electrical cell of the electrochemical type is formed by:
- an electrochemical block constituted by a stack of AgO—Al electrochemical couples located in a cavity of a sealed module connected to said thermostatic valve and to said device for circulation of the activation electrolyte and separation of the effluents;
- a reserve of anhydrous sodium hydroxide, said electrochemical block and said reserve of anhydrous sodium hydroxide being located in said second chamber.

9. The electrical propulsion cell according to claim 8, wherein said anhydrous sodium hydroxide reserve is constituted by a mixture of micropellets of anhydrous sodium hydroxide and powder-form stannates charge in bulk into said second chamber.

10. The electrical propulsion cell according to claim 1, wherein said sealed cell body is formed by an assembly of elements constituted by:
- a front collar;
- a front end of the main electrical cell;
- said front collar and said front end forming said third chamber;
- a central shell;
- a rear end of the main electrical cell;
- said central shell and said rear end forming said second chamber; and
- a rear collar;
- said rear end and said rear collar forming said first chamber.

11. The electrical propulsion cell according to claim 10, wherein said central shell is constituted by a metal alloy which conducts heat, a portion of said central shell which is located in a vicinity of said main electrical cell constituting a heat exchanger with said aquatic medium for at least a derivative flow of the activation electrolyte.

12. The electrical propulsion cell according to claim 11, wherein an internal face of said central shell, except for the portion forming the heat exchanger, comprises a thermally insulating coating at a portion forming the reservoir for the activation electrolyte, in order to reduce cooling of the activation electrolyte in the reservoir by heat exchange with the aquatic medium during the cruise phase.

13. The electrical propulsion cell according to claim 10, wherein the front collar, the front end of the main electrical cell, the central shell, the rear end of the main electrical cell and the rear collar are composed of a metal material, an external face thereof which is to be in contact with the aquatic medium being provided with a protective anti-corrosion layer obtained by hard anodic oxidation.

14. The electrical propulsion cell according to claim 10, wherein internal faces of the front end of the main electrical cell, the central shell and the rear end of the main electrical cell constituting said second member comprise a chemical nickel coating for protection against corrosion by anhydrous sodium hydroxide.

15. The electrical propulsion cell according to claim 10, wherein said sealed cell body is provided with a double sealing barrier with respect to said aquatic medium;
- a first sealing barrier formed by a first seal between the aquatic medium and the first chamber, and the third chamber respectively;
- a second sealing barrier formed by a second seal between the first and second chamber and the second and third chamber respectively.

16. The electrical propulsion cell according to claim 10, further comprising:
- a plurality of temperature sensors for flow of the activation electrolyte entering and leaving the main electrical cell, in order to be able to regulate the temperature of the flow of the activation electrolyte by means of a thermostatic valve;
- a plurality of sensors for sensing relative pressures of the activation electrolyte in the second chamber and the activation electrolyte at an inlet of a device for circulation of the activation electrolyte and separation of the effluents, said sensors of the relative pressures delivering relative pressure values with respect to a pressure outside the sealed cell body;
- a first contact for sealing the admission valve for the admission of water from the aquatic medium, and a second contact for opening the admission valve for the admission of water to the sealed cell body.

17. The electrical propulsion cell according to claim 10, wherein the front collar, the central shell and the rear collar have a substantially cylindrical cross-section of revolution.

18. The electrical propulsion cell according to claim 17, wherein the front collar and the rear collar each have a distal end with is open with respect to the front end and the rear end of the main electric cell, respectively, in order to construct said electrical propulsion cell, in the form of an independent module which can be stored as a substantially inert component with a charge of anhydrous sodium hydroxide reserve when the electrical propulsion cell is not mounted with the movable device, or in the form of an element integrated directly in a body of the movable device, the distal end of said front collar being secured mechanically and coupled electrically to an active portion of the movable device, the distal end of the rear collar being secured mechanically and coupled electrically to a propulsive and control rear portion of the movable device in order to constitute the electrical propulsion cell which can be activated as soon as the movable device is launched.

19. The electrical propulsion cell according to claim 1, wherein the electrical propulsion cell is combined with one of the following a torpedo, a reconnaissance submarine or a surface device, said electrical propulsion cell providing a supply of power to propulsion and control of said movable device.

20. The electrical propulsion cell according to claim 1, wherein said main electrical cell of the electrochemical type is an AgO—Al cell.

* * * * *